Sept. 3, 1968 GEORGE S. WU 3,400,320
CONVERTER HAVING DIODE RECTIFIERS IN A FEEDBACK VOLTAGE DIVIDER CIRCUIT FOR TEMPERATURE COMPENSATION
Filed Dec. 14, 1965
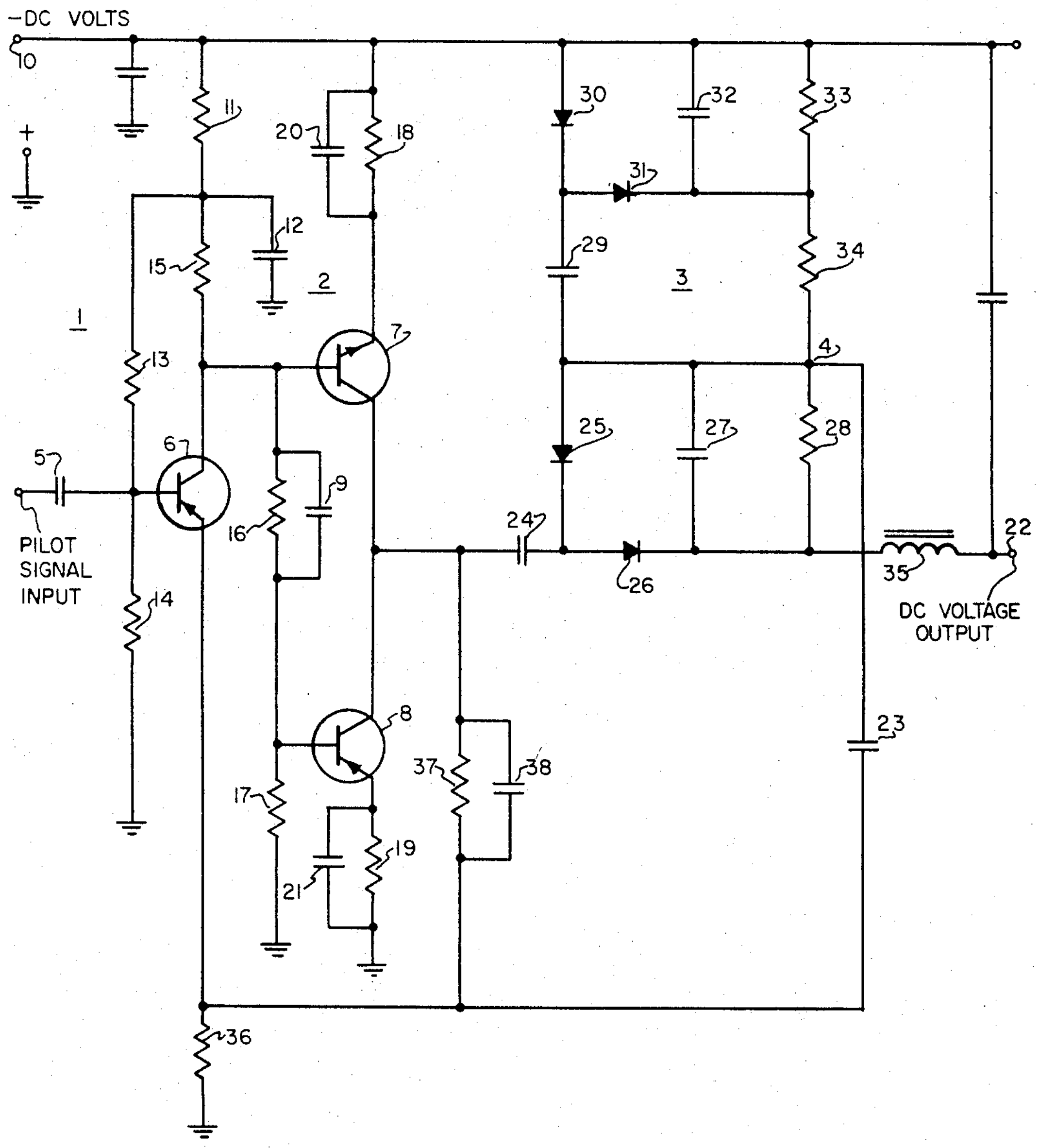
INVENTOR.
GEORGE S. WU
BY C. A. Gulbrandsen
ATTY.

United States Patent Office 3,400,320
Patented Sept. 3, 1968

3,400,320

CONVERTER HAVING DIODE RECTIFIERS IN A FEEDBACK VOLTAGE DIVIDER CIRCUIT FOR TEMPERATURE COMPENSATION

George S. Wu, Santa Clara, Calif., assignor, by mesne assignments, to Automatic Electric Laboratories, Inc., Northlake, Ill., a corporation of Delaware Filed Dec. 14, 1965, Ser. No. 513,748
3 Claims. (Cl. 321—16)

ABSTRACT OF THE DISCLOSURE

A converter comprises an amplifier stage to which constant alternating-current signal is applied, and a rectifier stage with two similar diode rectifier circuits connected in series across the output of the amplifier stage. The series rectifier circuits function as usual to convert the signals to direct-current voltage for a load circuit and in addition function as a feedback voltage divider in a negative feedback circuit connected to an input of the amplifier for regulating the overall gain of the converter. The regulation compensates for change in resistance of the diode rectifiers with change in temperature.

This invention relates to converters or demodulators that have control circuits for regualting output voltage. Particularly, this invention relates to rectifier circuits in which diodes that provide rectified output are included in a feedback circuit that is connected to a preceding amplifier.

A temperature regulated converter according to this invention may be included in communication or control circuits in which a constant rectifier output voltage is required in response to application of input signals that have constant amplitude. For example, the circuit that is shown in the accompanying drawing, is included in a telephone carrier system to provide nearly constant direct-current control voltage when an applied pilot signal of the carrier is maintained constant. The direct-current control voltage is utilized to control gain of amplifiers that amplify the carrier signal and is coupled to alarm circuits that operate when the pilot signal departs from its usual constant amplitude level.

A preferred circuit according to this invention has a two-stage transistor amplifier and a rectifier network. The rectifier network has two similar portions that are connected in series across the output of the amplifier. A negative feedback circuit is connected between the input circuit of the first stage of the transistor amplifier and a junction point of the two series portions of the rectifier. Therefore, in addition to providing rectified output voltage, the rectifier network functions as the usual feedback resistive voltage divider that is commonly used in amplifier circuits. The gain of the amplifier-rectifier circuit is mostly determined by the relative alternating-current impedances of the two portions of the rectifier network in the feedback circuit. These impedances are primarily the impedances of diodes within the network. Since change in ambient temperature causes approximately the same change in impedance for the different diodes, the ratio of the impedances in the feedback voltage divider remains approximately constant to maintain nearly constant rectifier output over a wide range of temperatures.

An object of this invention is to regulate a rectifier so that its output does not change with change in ambient temperature.

Another object is to regulate a rectifier by including diodes of the rectifier circuit in a feedback circuit connected to a preceding amplifier.

These objects, the following description, and the appended claims will be better understood by reference to the accompanying drawing in which a schematic diagram of a preferred circuit of a regulated rectifier according to this invention is shown.

In the accompanying drawing, the rectifier circuit comprises transistor amplifier stages 1 and 2 and a rectifier network 3. An intermediate point 4 of the rectifier network 3 is connected to the input of the amplifier 1 to apply negative feedback voltage thereto.

An input signal is applied through a capacitor 5 to the base of a type PNP transistor 6. The circuit as it is shown in the accompanying illustration has been used in systems where the frequency of the input signal is within a range of 50 kilocycles to 500 kilocycles. The second amplifier stage 2 has a type NPN transistor 7 and type PNP transistor 8 connected in a push-pull arrangement to apply signals from their common collector circuit to the rectifier network 3.

Direct-current operating voltages for the transistors 6, 7, and 8 are supplied through usual voltage divider circuits that are connected between a negative terminal 10 and ground. Voltage for the first amplifier stage 1 is applied from the negative terminal 10 through a voltage dropping resistor 11 that is bypassed by a capacitor 12. Resistors 13 and 14 are connected in series from the resistor 11 to ground, and the junction of the resistors 13 and 14 is connected to the base of the transistor 6. A voltage divider for applying direct-current voltages to the collector of the transistor 6 and to the bases of the transistors 7 and 8 may be traced from the resistor 11 through resistors 15, 16 and 17 to ground. The collector of the transistor 6 and the base of the transistor 7 are connected to the junction of the resistors 15 and 16, and the base of the transistor 8 is connected to the junction of the resistors 16 and 17. A capacitor 9 is connected across the resistor 16 to provide a low impedance coupling to the base of the transistor 8. The emitter-collector circuit of the transistors 7 and 8 extends from the terminal 10 through a resistor 18, the emitter-collector circuit of the transistor 7, the collector and emitter circuit of the transistor 8, and a resistor 19 to ground. The resistors 18 and 19 are bypassed by capacitors 20 and 21 respectively.

Amplified signal voltage is applied from the collectors of the transistors 7 and 8 to the rectifier network 3 for developing direct-current voltage to be applied to output terminal 22 and for developing alternating-current feedback signal to be applied through capacitor 23 to the emitter circuit of the transistor 6. Each one of the two similar series portions of the rectifier network 3 resembles a voltage doubler. However, with respect to the direct-current output circuit, the rectifier, when connected in this arrangement, does not function as a usual doubler to increase the output voltage.

One of the similar portions of the network 3 comprises a filter capacitor 24, diodes 25 and 26, a filter capacitor 27, and a resistor 28. The other portion comprises a filter capacitor 29, diodes 30 and 31, a filter capacitor 32, and a resistor 33. A resistor 34 is connected between corresponding capacitors 27 and 32 of the two portions to complete a direct-current output circuit that is connected to the terminal 22.

The rectifier network 3 can be better understood by tracing the circuit for charging the filter capacitors. When the signal voltage on the collectors of transistors 7 and 8 is approaching a negative peak, the circuit for charging the capacitors 24 and 29 may be traced from the negative terminal 10 through the diode 30, the capacitor 29, the diode 25, the capacitor 24, and the emitter-collector circuit of the transistor 8 to ground. The diode 26 and the capacitor 27 are connected in series across the diode 25, and similarly, the diode 31 and the capacitor 32 are connected in series across the diode 30. The diodes 26 and 31 are connected in a sense opposite to that of the diodes 25 and 30. When the signal voltage on the collectors of the transistors 7 and 8 is approaching a positive peak, the circuit for charging the capacitors 27 and 32 may be traced from the collectors through the capacitor 24, the diode 26, the capacitor 27, the capacitor 29, the diode 31, and the capacitor 32 to the negative terminal 10. The voltages that have been retained on the capacitors 24 and 29 are added to the voltages applied from the collector of the transistors 7 and 8 so that the sum of the voltages that is applied to capacitors 27 and 32 is approximately equal to the applied peak voltage plus the sum of the voltages that are retained on the capacitors 24 and 29.

A bleeder circuit comprises resistors 28, 34, and 33 connected in series across the output of the rectifier network 3. The resistor 28 is connected across the capacitor 27; the resistor 34 is connected between the capacitors 27 and 32; and the resistor 33 is connected across the capacitor 32.

In the direct-current output circuit, a filter choke coil 35 is connected between the terminal 22 and the junction of the diode 26 and the capacitor 27 for filtering the output and for preventing a short circuit across the alternating-current impedance of the filter network that supplies feedback voltage. The direct-current output circuit includes the capacitor 27, the resistor 34, and the capacitor 32. The voltage that is developed across the resistor 34 by the discharge of the capacitor 29 through the diode 31 opposes the voltages that are applied by capacitors 27 and and 32 to the output circuit.

The junction 4 of the capacitors 27 and 29 is at about the midpoint of the rectifier network with respect to the impedance that the network offers to signal current; it is coupled through the capacitor 23 to the emitter of the transistor 6. The junction of the capacitor 23 and the emitter of the transistor 6 is connected through a resistor 36 to ground. An additional negative feedback circuit is connected directly from the ouput of the amplifier, the collectors of the transistors 7 and 8, through a resistor 37 and a capacitor 38 that are connected in parallel, and through the resistor 36 to ground.

During alternate periods for charging the capacitors 24 and 29 and the capacitors 27 and 32 of the rectifier network 3, that portion of the network 3 which includes diodes 25 and 26 provides a relatively low impedance path in parallel with the feedback resistor 37; and the other portion that includes diodes 30 and 31 provides a low impedance path in parallel with the emitter resistor 36. With respect to rectified output voltage, the feedback circuit that is completed through the rectifier network predominates to provide gain conrol.

In a typical transistor amplifier and diode rectifier circuit that does not incorporate voltage control, the direct-current output changes substantially with wide ambient temperature changes because the forward voltage across the diode changes. By incorporating diodes that provide direct-current output in a feedback circuit according to the present invention, the changes in output are decreased substantially. In an application of a circuit according to the accompanying drawing where a 12-volt output is required, the output does not change more than 0.1 volt when the ambient temperature changes from 0° centrigrade to 65° centigrade.

With respect to negative feedback circuits in amplifiers, the gain is usually expressed as being substantially determined by the ratio of the impedances in the feedback circuit. When the gain of the amplifier without feedback is high compared with the gain with feedback, the gain is approximately equal to the ratio of the total feedback impedance that appears across the output circuit of the amplifier to that portion of the feedback impedance that is common to the input circuit.

Likewise, in the present circuit, the voltage gain of the amplifier-rectifier circuit may be expressed in impedances of the two similar portions of the rectifier network 3. Let the impedance of the portion that contains diodes 25 and 26 be Za and the impedance of the portion that contains diodes 30 and 31 be Zb, then the gain A of the circuit is:

$$A \cong \frac{Za + Zb}{Zb}$$

Since the two portions are similar, $Za \cong Zb$ and therefore the gain $A \cong 2$. In a typical application of the circuit as shown in the accompanying drawing, the peak-to-peak input voltage is 10 volts, and the peak-to-peak voltage at the collectors of transistors 7 and 8 is 22 volts.

Experimental results show that the value of the resistor 34 can be selected to minimize the effect of the change in resistance of the diodes. The rectifiers may be represented by a battery to which is connected a series circuit comprising resistor 34, the variable resistance of a diode, and an output load. If $R_0$ represents the output resistance of this equivalent circuit as it appears to the load, the resistance $R_{34}$ of the resistor 34 can be chosen so that the variable resistance of the diode appears to be minimum, that is, $R_{34}=R_0$. The proper value of $R_{34}$ is most easily determined by at first using a variable resistor and adjusting it until the variation in the diode resistance causes minimum change of voltage across the output load.

A circuit according to the accompanying drawing has the following types of components and values for obtaining a 12-volt output in response to application of 2.2-volt input signal within a frequency range of 50 kilocycles to 500 kilocycles per second:

| | |
|---|---|
| Transistors **6** and **8** | Type 2N404. |
| Transistor **7** | Type 2N696. |
| Diodes **25, 26, 30,** and **31** | Germanium type 1N277. |
| Resistors **28, 33,** and **36** | 10K Ohms. |
| Resistor **37** | 19.6K Ohms. |
| Resistor **34** | 7.5K Ohms. |
| Capacitor **38** | 40 picofarads. |
| Capacitors **24, 27, 29,** and **32** | 0.1 microfarads. |

Although this invention has been described with reference to a single embodiment, other embodiments that use amplifier and rectifier circuits that are obvious to one skilled in the art will be within the scope of the following claims that claim a feedback circuit for regulating the output of a rectifier circuit.

I claim:

1. A temperature compensated rectifier circuit comprising:

an amplifier having a signal input circuit, a feedback input circuit and an output circuit, a rectifier network having first, second, third, and fourth diodes, first, second, third and fourth filter capacitors, and a resistive voltage divider, said first capacitor, said first diode, said second capacitor, and said second diode being successively connected in series across said output circuit, said diodes being connected in the same sense for charging said first and second capacitors, said third diode and said third capacitor being connected in a series circuit across said first diode, said fourth diode and said fourth capacitor being connected in a series circuit across said second diode, said third and fourth diodes being connected in an opposite sense from that of said first and second diodes, the positions of said third and fourth diodes being such that a charging circuit for said third and fourth capacitors may be traced in said output circuit of said amplifier from said first capacitor through said third diode, said third capacitor, said second capacitor, said fourth diode, and said fourth capacitor successively, said voltage divider being connected across said output and having intermediate taps for connecting separated portions of said voltage divider across said third and fourth capacitors, and capacitive means for coupling said feedback input circuit across said second and fourth diodes for applying negative feedback voltage to said amplifier.

2. In a rectifier circuit according to claim 1 having an impedance element that is connected between the output circuit of said amplifier and said feedback input circuit to stabilize the gain of said amplifier.

3. In a converter of the type having an alternating-current amplifier, rectifying means connected to the output of said amplifier, and feedback means connected between said rectifying means and a feedback input of said amplifier, said converter converting alternating-current signal applied to a signal input of said amplifier to direct-current voltage supplied from an output of said rectifying means, said feedback means regulating said direct-current voltage, said rectifying means comprising first and second similar diode rectifier circuits connected in series to provide a junction therebetween, the series diode rectifiers being connected across said output of said amplifier, said serially connected rectifier circuits functioning as an integral rectifier to supply said direct-current voltage and functioning as a feedback voltage divider across the output of said amplifier, said junction corresponding to a middle tap of said voltage divider, and said feedback means including alternating-current coupling means connected between said corresponding middle tap and said feedback input of said amplifier, said feedback means maintaining constant gain between the signal input of said amplifier and the output of said rectifying means to compensate for voltage changes which develop uniformly across said diode rectifiers when temperature changes.

References Cited

UNITED STATES PATENTS

| | | | |
|---|---|---|---|
| 2,968,738 | 1/1961 | Pintell | 321—2 XR |
| 3,046,466 | 7/1962 | Tyrrell et al. | 221—16 |
| 3,112,449 | 11/1963 | Miller. | |
| 3,235,784 | 2/1966 | Kordes et al. | 321—18 |
| 3,297,880 | 1/1967 | Clarke | 321—16 XR |

LEE T. HIX, *Primary Examiner.*

W. M. SHOOP, Jr., *Assistant Examiner.*